Patented May 9, 1939

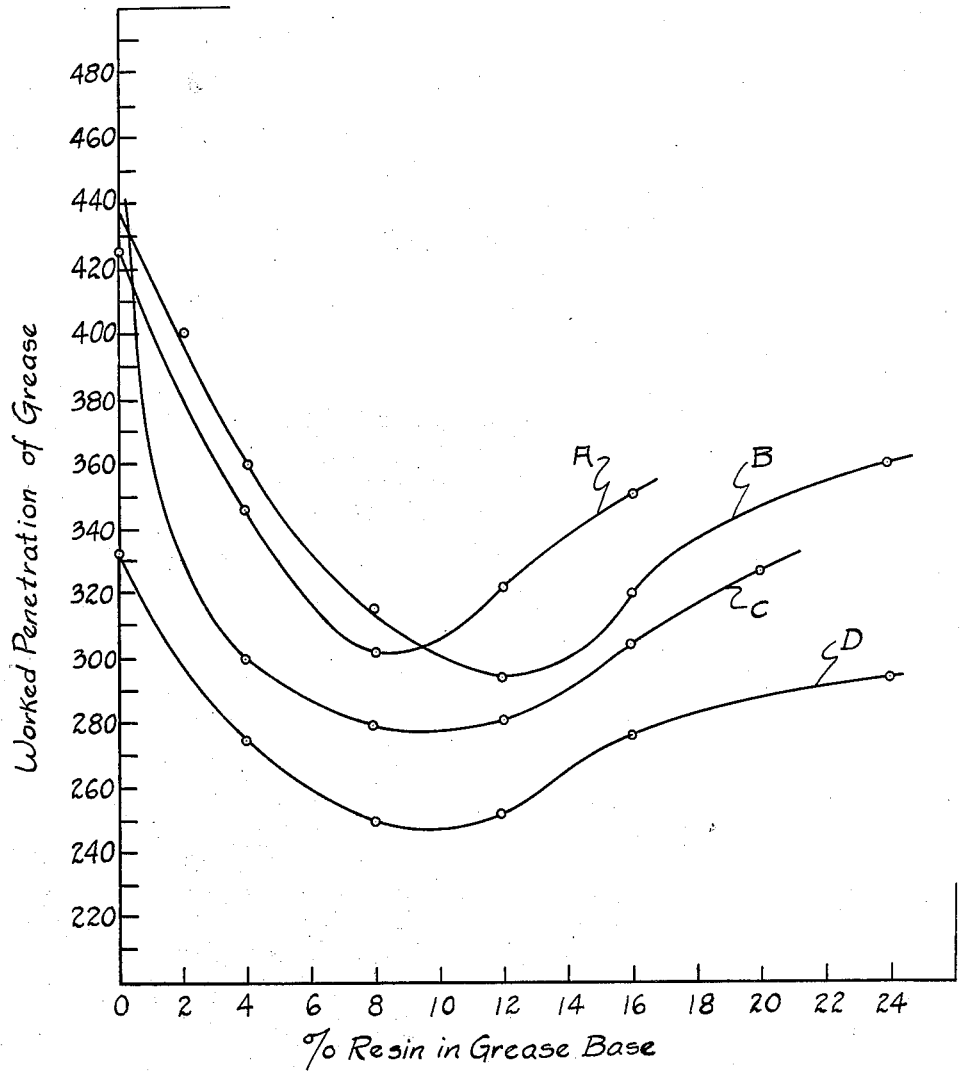

2,157,647

UNITED STATES PATENT OFFICE 2,157,647

LUBRICATING GREASE

Paul E. Burchfield, Lansdowne, Pa., assignor to The Harshaw Chemical Company, Elyria, Ohio, a corporation of Ohio Application April 1, 1938, Serial No. 199,481

8 Claims. (Cl. 87—9)

This invention relates to aluminum stearate greases and particularly to compositions containing mineral oil, aluminum stearate and a resinous modifier. Mixtures of mineral oil and aluminum stearate combined by means of slow heating and stirring or equivalent treatment, upon very slow cooling, produce a soft product and, upon more rapid cooling, produce a harder product. The product which is cooled very slowly remains homogeneous, while the harder product, produced by more rapid cooling, tends to be unstable, that is, the ingredients separate. The very slow cooling is, thus, desirable, but, where a grease of low penetration is desired, does not produce a satisfactory product.

Accordingly, it is the object of the invention to provide a modifier, which, if used in correct proportion with respect to aluminum stearate, will produce a hard grease upon slow cooling while retaining maximum stability.

With the foregoing and other objects in view, the invention consists in the novel features hereinafter described, reference being had to the accompanying drawing wherein the figure is a graphic representation of the effect of addition of varying quantities of my novel aluminum stearate base to mineral oil under varying conditions.

I have discovered that rosin and equivalent resinous materials of high acid value (above 25), when added to aluminum stearate, by which term is meant the mono-, di- and tri- stearates and mixtures thereof, in proportion up to 16 to 20 parts by weight, show the desired effect. The maximum effect occurs at from 8 to 12 parts by weight. It is not desirable to add more than about 16 parts by weight of the resinous material since in the concentration range, from 16 to 20 parts, an undesirable consistency, which may be designated as "rubbery", becomes apparent. On the other hand, the desired effect is not secured in sufficient degree to be satisfactory for any practical purposes until about 2 parts by weight have been added.

The above statement of proportions means that in 100 parts by weight of the mixtures, the specified number of parts is resinous material and the remainder is aluminum stearate. It is to be understood that addition of non-essential diluents is within the scope of the invention and the claims are to be read accordingly.

Resinous materials which are of value are rosin or colophony, hydrogenated rosin, Oregon balsam, Sandarac, soft manila, kauri, copaiba balsam, dammar, Canada balsam and East India gum mixtures of two or more of these materials may be used. The desirable effect is exhibited irrespective of the percentage of base (aluminum stearate resin mixture) in the mineral oil, the viscosity of the oil or the rate of cooling, although in different degree. (Oregon balsam is similar to Canada balsam and is obtained principally from the Douglas fir.)

The following particular examples will serve to illustrate the principle of the invention.

Example No. I

Hydrogenated rosin and aluminum stearate in varying proportions, as indicated in the following table, were added to mineral oil having a viscosity of 192 sec. Saybolt at 210° F., and were incorporated therewith by heating with stirring. The mixture was cooled from 245° F. to room temperature (70° F.) over a period of 8 hours. The composition of the base and the worked penetration resulting are shown in the following table:

| Composition of base in parts by weight | | Worked penetration by A. S. T. M. method |
|---|---|---|
| Aluminum stearate | Hydrogenated Rosin | |
| 100 | 0 | 424 |
| 96 | 4 | 347 |
| 92 | 8 | 302 |
| 88 | 12 | 322 |
| 76 | 24 | 353 |

In this case, the amount of the base was 10% of the resulting grease. This example is graphically illustrated in the drawing by curve A.

Example No. II

Rosin (not hydrogenated) was employed under conditions similar to those of Example I, except that the viscosity of the oil was 100 sec. Saybolt at 210° F. and the rate of cooling was 16 hours instead of 8. The result was as follows:

| Composition of base in parts by weight | | Worked penetration by A. S. T. M. method |
|---|---|---|
| Aluminum stearate | Rosin | |
| 100 | 0 | Semi-liquid |
| 98 | 2 | 400 |
| 96 | 4 | 360 |
| 92 | 8 | 315 |
| 88 | 12 | 295 |
| 84 | 16 | 320 |
| 76 | 24 | 360 |

The amount of base was 10% of the resulting grease. This example is graphically illustrated in the drawing by curve B.

Example No. III

The conditions of Example II were duplicated, except that the amount of base was 5% instead of 10% and a higher quality aluminum stearate was used. The result was as follows:

| Composition of base in parts by weight | | Worked penetration by A. S. T. M. method |
|---|---|---|
| Aluminum stearate | Rosin | |
| 100 | 0 | Semi-liquid |
| 96 | 4 | 300 |
| 92 | 8 | 278 |
| 88 | 12 | 280 |
| 84 | 16 | 302 |
| 80 | 20 | 326 |

This example is graphically illustrated in the drawing by curve C.

*Example No. IV*

Oregon balsam and aluminum stearate in varying proportions, as indicated in the following table, were added to mineral oil having a viscosity of 54 sec. Saybolt at 210° F. Incorporation was in the same manner as Example I and cooling was from 245° F. to 70° F. in 8 hours. The amount of base in the grease was 10%.

| Composition of base in parts by weight | | Worked penetration by A. S. T. M. method |
|---|---|---|
| Aluminum stearate | Oregon balsam | |
| 100 | 0 | 332 |
| 96 | 4 | 275 |
| 92 | 8 | 250 |
| 88 | 12 | 251 |
| 84 | 16 | 278 |
| 76 | 24 | 295 |

This example is illustrated graphically in the drawing by curve D.

The improved base may be produced in any suitable manner as by grinding together the dry ingredients or by admixing the resinous material with stearic acid, saponifying with NaOH and precipitating with a suitable aluminum salt as aluminum sulphate.

The mineral oil of lubricating viscosity and the modified stearate base containing less than ½% moisture and preferably less than 1/10%, are heated together, the base being used in quantity to produce the desired hardness of the grease. As indicated by the above examples, the quantity of base may be preferably from 5% to 10%, but these are merely exemplary and not limiting proportions.

It is uncertain whether the ingredients of the grease base react or remain a simple mixture. In either case, the product is herein described as a mixture of the starting materials.

Having thus described my invention, what I claim is:

1. An aluminum stearate grease base comprising an intimate mixture of aluminum stearate and a natural resin material of acid number not less than 25, the said ingredients being present in approximately the following proportions by weight:

| | Parts |
|---|---|
| Resinous material | 2 to 16 |
| Aluminum stearate | 98 to 84 |

2. An aluminum stearate grease base comprising an intimate mixture of aluminum stearate and a natural resin material of acid number not less than 25, the said ingredients being present in approximately the following proportions by weight:

| | Parts |
|---|---|
| Resinous material | 8 to 12 |
| Aluminum stearate | 92 to 88 |

3. An aluminum stearate grease base comprising an intimate mixture of aluminum stearate and a resinous material of the group consisting of rosin, hydrogenated rosin, Oregon balsam and mixtures thereof, the said ingredients being present in approximately the following proportions by weight:

| | Parts |
|---|---|
| Resinous material | 2 to 16 |
| Aluminum stearate | 98 to 84 |

4. An aluminum stearate grease base comprising an intimate mixture of aluminum stearate and a resinous material of the group consisting of rosin, hydrogenated rosin, Oregon balsam and mixtures thereof, the said ingredients being present in approximately the following proportions by weight:

| | Parts |
|---|---|
| Resinous material | 8 to 12 |
| Aluminum stearate | 92 to 88 |

5. A grease of low penetration comprising mineral oil of lubricating viscosity containing an aluminum stearate base in sufficient quantity to impart desired hardness, the said base comprising a mixture of aluminum stearate and a natural resin material of acid number not less than 25, the said base ingredients being present in proportion by weight approximately as follows:

| | Parts |
|---|---|
| Resinous material | 2 to 16 |
| Aluminum stearate | 98 to 84 |

6. A grease of low penetration comprising mineral oil of lubricating viscosity containing an aluminum stearate base in sufficient quantity to impart desired hardness, the said base comprising a mixture of aluminum stearate and a natural resin material of acid number not less than 25, the said base ingredients being present in proportion by weight approximately as follows:

| | Parts |
|---|---|
| Resinous material | 8 to 12 |
| Aluminum stearate | 92 to 88 |

7. A grease of low penetration comprising mineral oil of lubricating viscosity containing an aluminum stearate base in sufficient quantity to impart desired hardness, the said base comprising a mixture of aluminum stearate and a resinous material of the group consisting of rosin, hydrogenated rosin, Oregon balsam, and mixtures thereof, the resinous material being present in the base to the extent of 2 to 16 parts in 100 parts of base.

8. A grease of low penetration comprising mineral oil of lubricating viscosity containing an aluminum stearate base in sufficient quantity to impart desired hardness, the said base comprising a mixture of aluminum stearate and a resirous material of the group consisting of rosin, hydrogenated rosin, Oregon balsam, and mixtures thereof, the resinous material being present in the base to the extent of 8 to 12 parts in 100 parts of base.

PAUL E. BURCHFIELD.